United States Patent
Singhal et al.

(10) Patent No.: US 7,390,473 B1
(45) Date of Patent: Jun. 24, 2008

(54) METHOD OF MAKING FINE LITHIUM IRON PHOSPHATE/CARBON-BASED POWDERS WITH AN OLIVINE TYPE STRUCTURE

(75) Inventors: Amit Singhal, Piscataway, NJ (US);
Abhijeet Dhamne, Somerset, NJ (US);
Ganesh Skandan, Piscataway, NJ (US)

(73) Assignee: NEI Corp., Piscataway, NJ (US)

( * ) Notice: Subject to any disclaimer, the term of this patent is extended or adjusted under 35 U.S.C. 154(b) by 54 days.

(21) Appl. No.: 11/165,926

(22) Filed: Jun. 24, 2005

Related U.S. Application Data

(63) Continuation-in-part of application No. 10/695,520, filed on Oct. 28, 2003.

(60) Provisional application No. 60/421,840, filed on Oct. 29, 2002, now abandoned.

(51) Int. Cl.
*C01B 25/26* (2006.01)
(52) U.S. Cl. .................. 423/306; 423/179.5; 252/518.1; 252/502; 429/218.1; 429/221
(58) Field of Classification Search .................. 252/500, 252/502, 518.1; 423/306, 179.5; 429/218.1, 429/221
See application file for complete search history.

(56) References Cited

U.S. PATENT DOCUMENTS

| | | | |
|---|---|---|---|
| 5,624,668 A * | 4/1997 | Lawrence et al. | 424/78.17 |
| 6,730,434 B1 * | 5/2004 | Kawakami et al. | 429/218.1 |
| 2002/0192137 A1 | 12/2002 | Chaloner-Gill | |
| 2002/0195591 A1 * | 12/2002 | Ravet et al. | 252/500 |
| 2004/0086445 A1 * | 5/2004 | Armand et al. | 423/306 |
| 2007/0054187 A1 * | 3/2007 | Nuspl et al. | 429/218.1 |

FOREIGN PATENT DOCUMENTS

| WO | WO02/27824 | * | 4/2002 |
|---|---|---|---|
| WO | WO2005/051840 | * | 6/2005 |

OTHER PUBLICATIONS

Chen et al. "Reducing Carbon in LiFePO4/C Composite Electrodes to Maximize Specific Energy, Volumetric Energy, and Tap Density." Journal of the Electrochemical Society, 149(9), A1184-A1189, 2002. □□*

Yang et al. "Preparation of LiFePO4 powders by co-precipitation." Journal of Power Sources, 146, 539-543, 2005.*

Lawrence RJ. "Development and comparison of iron-dextran products" PDA J. of Pharm Sci Technol, vol. 52, pp. 190-197, 1998.*

(Continued)

*Primary Examiner*—Mark Kopec
*Assistant Examiner*—Tri V Nguyen
(74) *Attorney, Agent, or Firm*—William L. Botjer

(57) ABSTRACT

Processes for producing fine $LiFePO_4/C$ and nanostructured $LiFe_xM_{1-x}PO_4/C$ composite powders, where $1 \leq x \leq 0.1$ and M is a metal cation. Electrodes made of either nanostructured $LiFe_xM_{1-x}PO_4$ powders or nanostructured $LiFe_xM_{1-x}PO_4/C$ composite powders exhibit excellent electrochemical properties. That will provide high power density, low cost and environmentally friendly rechargeable Li-ion batteries.

9 Claims, 6 Drawing Sheets

OTHER PUBLICATIONS

A. K. Padhi, K. S. Nanjundaswamy and J. B. Goodenough: "Phospho Olivines . . . ", J. Electrochem. Soc., 144, 1188 (1997).

A. Yamada, S. C. Chung and K. Hinokuma, "Optimized LiFePO4 . . . " J. Electrochem. Soc., 148 (3), A224 (2001).

H. Huang, S.-C., Yin and L. F. Nazar, "Approaching Theoretical Capacity of LiFePO4 . . . " *Electrochemical and Solid-State Letters*, 4 (10), A170 (2001).

J. Barker, M. Y. Saidi and J. L. Swoyer, "Lithium Iron(II) Phospho-Olivines . . . ", Electrochem. Solid State Lett., 6, A53, (2003); S. Frager, C. Bourbon and F. Le. Cras, J. Electrochem. 151, A1024 (2004).

S.-Y. Chung, J. T. Blocking and Y.-M. Chiang, "Electronically Conductive Phospho-Olivines . . . " *Nature Materials*, 1, 123 (2002)].

S. Frager, C. Bourbon and F. Le. Cras, "Optimized Lithium Iron Phosphate . . . "; J. Electrochem. 151, A1024 (2004).

* cited by examiner

METHOD OF MAKING FINE LITHIUM IRON PHOSPHATE/CARBON-BASED POWDERS WITH AN OLIVINE TYPE STRUCTURE

CROSS REFERENCE TO RELATED APPLICATIONS

This application is a CIP of U.S. patent application Ser. No. 10/695,520 filed Oct. 28, 2003 which claims priority of U.S. provisional application No. 60/421,840 filed Oct. 29, 2002 now abandoned.

STATEMENT OF GOVERNMENT SUPPORT OF THE INVENTION

This work was done as part of a phase II SBIR contract from NASA under contract number NNG04CA24C.

BACKGROUND OF THE INVENTION

This invention relates to the production of Lithium Iron phosphate ($LiFePO_4$)-based powders as active cathode materials in Li-ion and Li rechargeable batteries.

There is an immediate need for reliable, safe, and non-toxic rechargeable batteries with high energy density, high power density, good shelf life, and low cost, for use in electric vehicle type applications. Such batteries can also be used in other commercial applications such as, wireless communication devices, camcorders and laptop computers. Rechargeable Li-based batteries, particularly rechargeable Li-ion batteries, are becoming the system of choice because of their overall good performance and high energy density. Presently, a majority of commercial Li-ion batteries use coarse $LiCoO_2$ as cathode material; however, $LiCoO_2$ has poor thermal stability and is toxic, rendering them unsuitable for large-sized battery applications, such as electric and hybrid vehicles, that require batteries to be stable, economical and environmentally friendly, along with good performance.

$LiFePO_4$ has an ordered olivine type structure (olivine phase) and has recently been investigated as an attractive cathode material because of its high theoretical capacity, 167-171 mAh/g, low cost and non-toxicity. FIG. 1 shows the olivine structure, where chains (along the c direction) of edge-sharing transition metal—octahedra are connected to one another by phosphate tetrahedra. These $(FePO_4)^-$ tetrahedral are connected to one another by octahedrally coordinated lithium atoms along the b axis [A. K. Padhi, K. S, Nanjundaswamy and J. B. Goodenough, J. Electrochem. Soc., 144, 1188 (1997)]. Among all olivine $LiMPO_4$ compounds (M=Co, Mn, Fe, Ni and V), $LiFePO_4$ has been studied most extensively, since the demonstration by Padhi et al. that it is possible to fabricate electrochemically active $LiFePO_4$ compounds. Later on, Yamada et al. [A. Yamada, S. C. Chung and K. Hinokuma, J. Electrochem. Soc., 148 (3), A224 (2001)] prepared coarse $LiFePO_4$, and showed that it is possible to achieve a capacity of ~160 mAh/g at a low current density. This data suggests that $LiFePO_4$ cathode material has the potential to be a good candidate for Li-ion batteries.

However, the electronic conductivity of $LiFePO_4$ is poor, and it is in the range of $10^{-7}$-$10^{-8}$ S/cm. In order to utilize this material in commercial Li-ion batteries, the electronic conductivity of this material needs to be improved. The electronic conductivity problem is ameliorated either by coating the $LiFePO_4$ particle surface with a thin carbon layer, by intimately mixing cathode particles with small-sized carbon particles, or by doping metals supervalent to $Li^+$ [S.-Y. Chung, J. T. Blocking and Y.-M. Chiang, Nature Materials, 1, 123 (2002)] In the last few years, a large amount of research [H. Huang, S.-C., Yin and L. F. Nazar, Electrochemical and Solid-State Letters, 4 (10), A170 (2001); U.S. Patent Publication No. US2002/0192137A1; J. Barker, M. Y. Saidi and J. L. Swoyer, Electrochem. Solid State Lett., 6, A53, (2003); S. Frager, C. Bourbon and F. Le. Cras, J. Electrochem. 151, A1024 (2004); and Z. Chen and J. R. Dahn, J. Electrochem. Soc., 149, A1184 (2002)] has been done to produce $LiFePO_4/C$ composite materials using different methodologies.

Huang et al. [H. Huang, S.-C., Yin and L. F. Nazar, Electrochemical and Solid-State Letters, 4 (10), A170 (2001)] synthesized nanocomposites of $LiFePO_4$ and conductive carbon by two different methods, which led to enhanced electrochemical accessibility of the Fe redox centers in this insulating material. In method A, a composite of phosphate with a carbon xerogel was formed from a resorcinol-formaldehyde precursor; in method B, surface oxidized carbon particles were used as nucleating agents for phosphate growth. They observed that electrochemical properties of powders prepared by method A were better because of the intimate contact of carbon with $LiFePO_4$ particles. The resultant $LiFePO_4/C$ composite achieved 90% theoretical capacity at C/5, with good cyclability. In general, xerogels and aerogels have poor packing density, which lead to rechargeable Li-ion batteries with low volumetric densities. Additionally, the amount of carbon in the composite was about 15%, which is too high for use in commercial Li-ion batteries.

Chaloner-Gill et al. [U.S. Patent Publication No. US2002/0192137A1] described the production of nanoscale and submicron particles of $LiFePO_4$ and $LiFe_{1-x}Mn_xPO_4$ ($0.4 \leq x \leq 0$) by a laser pyrolysis method. However, laser pyrolysis methods are relatively expensive processes, and powders produced by such processes are not suitable for cost conscious applications, such as electric and hybrid vehicles. S. Frager et al. synthesized $LiFePO_4/C$ composites using a mechanochemical activation method, which utilizes a high energy mill. It is generally believed that it is difficult to produce large quantities of powders at a low cost using a high energy mill process.

Barker et al. [J. Barker, M. Y. Saidi and J. L. Swoyer, Electrochem. Solid State Lett., 6, A53, (2003)] developed a carbothermal process. In this process, the transition metal reduction and lithium incorporation processes are each facilitated by a high temperature process, which is based on C$\Longrightarrow$CO transition. A mixture of $LiH_2PO_4$, $Fe_2O_3$ and C powders was pressed and heat treated at 750° C. for 8 hrs to form $LiFePO_4$ powder. Although the carbothermal method is a single step process, the size of particles produced by this method is relatively large. SEM and light scattering data indicated significant amount of agglomeration in the powders. The average size of the agglomerates was ~100 µm, and the size of the primary particle size was in the several microns range comparable to that of $Fe_2O_3$ precursor. Additionally, it has been observed that optimum performance from $LiFePO_4$ powders can be obtained by reducing the particle size. Yamada and coworkers [A. Yamada, S. C. Chung and K. Hinokuma, J. Electrochem. Soc., 148 (3), A224 (2001)] reported that $LiFePO_4$ particles experience an abrupt increase in particle size and lose their capacity, if the reaction temperature is >600° C.

SUMMARY OF THE INVENTION

The present invention focuses on developing low cost and easily scalable processes for producing $LiFe_xM_{1-x}PO_4/C$ composite powders with fine particles of $LiFe_xM_{1-x}PO_4$, where $1 \leq x \leq 0.5$ and M is a metal cation with a +2 oxidation state. M can be either a transition metal such as (but not limited to) Mn, Ni, Co and V, a non-transition metal such as (but not limited to) Mg, Sr, Ca, and Sn or a mixture thereof. The objective of the present invention is to produce fine $LiFe_xM_{1-x}PO_4/C$ composite powders that exhibit good electrochemical properties in one single processing step. The use of small particle size of cathode materials will improve the power density of Li-ion batteries because of the small diffusion distances of Li-ions. As mentioned earlier, lithium metal phosphates are known to have poor electronic conductivity. Since electronic conductivity of $LiFe_xM_{1-x}PO_4$ powders can be enhanced by intimately mixing them with ultrafine carbon particles, the use of fine $LiFe_xM_{1-x}PO_4/C$ composite powders will lead to high power density, low cost and environmentally benign rechargeable Li-ion batteries.

The present invention pertains to a method for producing fine $LiFe_xM_{1-x}PO_4/C$ composite powders where particles of $LiFe_xM_{1-x}PO_4$ and C are intimately mixed with each other in one single processing step. The method comprises mixing sugar coated iron hydroxide nanoparticles (20-30 nm) with a metal salt such as manganese salt if x<1, an iron-based compound such as iron oxide powder, a lithium salt (e.g., $Li_2CO_3$) and an ammonium phosphate salt (e.g., $NH_4H_2PO_4$). In one aspect, the invention provides $LiFe_xM_{1-x}PO_4$ particles with an average particle size less than 1 μm.

BRIEF DESCRIPTION OF THE DRAWINGS

For a better understanding of the invention, reference is made to the following drawings which are to be taken in conjunction with the detailed description to follow in which.

DESCRIPTION OF THE PREFERRED EMBODIMENTS

Figure 1:
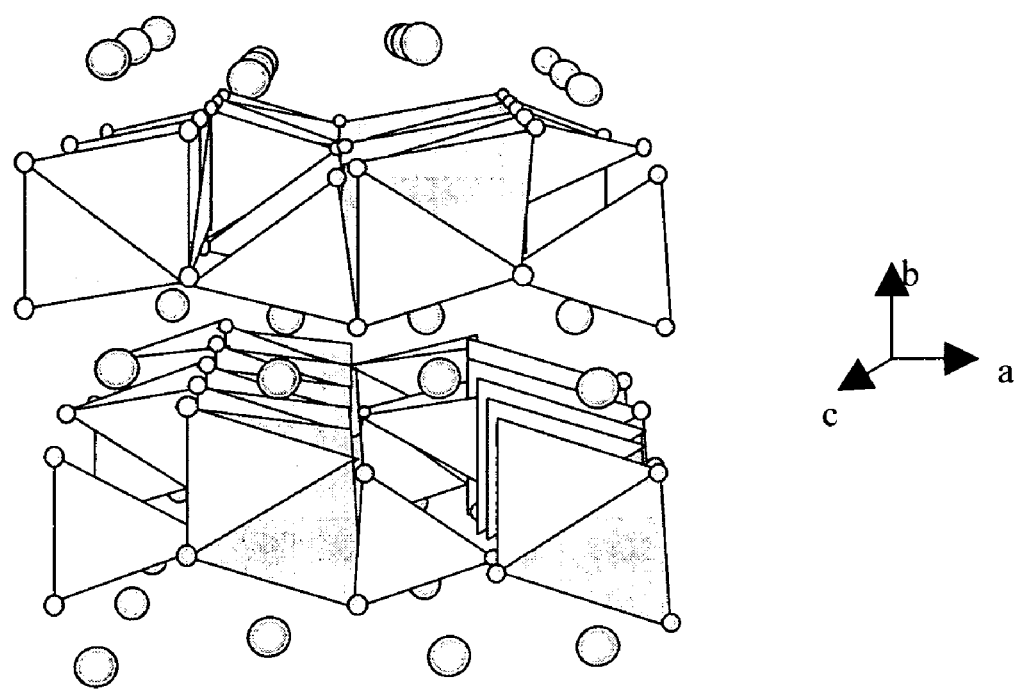
FIG. 1 is a schematic illustrating the olivine type structured of lithium metal phosphates.

The process of producing $LiFe_xM_{1-x}PO_4/C$ composite powders utilizes (i) a commercially available Iron dextran powder, which is essentially an iron hydroxide nanoparticle coated with dextran (large sugar molecule) molecules: the average particle size of coated nanoparticles is in the range of 20-30 nm, (ii) an iron-based compound (such as, but not limited to: iron oxide, iron hydroxide, iron acetate, iron phosphate, iron sulphate, iron oxalate, iron nitrate (ii) a chemical precursor of cation dopants (such as, but not limited to: metal nitrate, metal carbonate, metal acetate, metal chloride, metal 2,-4 pentanedionate, metal formate, metal oxalate and metal alkoxide) or metal oxide particles (such as, but not limited to $MnO_2$, $CO_3O_4$, $NiO$, $V_2O_5$, $CaO$, $SnO_2$, and $MgO$) where the material needs to be doped (iii) a lithium salt (such as, but not limited to: lithium nitrate, lithium halides, lithium carbonates, lithium hydroxide and lithium acetate, and (iv) a chemical precursor of phosphate ions (such as, but not limited to ammonium hydrogen phosphate, ammonium dihydrogen phosphate, ammonium phosphate, orthophosphoric acid, and lithium hydrogen phosphate).

In the present chemical synthesis method, an iron dextran solution, an iron-based compound, a precursor of metal cation (if material needs to be doped), wherein the metal cation is either a transition metal such as Co, V, Ni and Mn or a non-transition metal, a lithium salt, and a chemical precursor of phosphate ions are dispersed in acetone. This mixture is homogeneously mixed either using a high speed shear mixer or using a jar mill. The solid powder is removed either by evaporating, filtering or centrifuging. The dried powder is calcined at a temperature in the range of 400-600° C. in an inert atmosphere (e.g., $N_2$, Ar) to remove volatile compounds, to reduce $Fe^{3+}$ to $Fe^{2+}$, and to form crystalline $LiFePO_4$ phase. In a few cases, the calcined powder is further annealed at a temperature between 550 and 700° C. in a controlled atmosphere to achieve the appropriate crystalline phase. Once the crystallization of the olivine phase is completed, further high temperature annealing will form coarse particles by promoting sintering between particles. Therefore, the lowest possible annealing temperature needs to be utilized in order to maintain the small-size of $LiFe_xM_{1-x}PO_4$ particles. Annealed powders were milled in a jar mill to break up soft agglomerates, if needed. It is to be noted that acetone in the process was used to homogeneously different precursor powders. We believe it will be possible to homogeneously mix different reactants in a dry state by using mechanical mixing methods. In addition, the calcination and the high temperature annealing steps can also be carried out at low pressures to avoid the oxidation of $Fe^{2+}$ and carbon (i.e. at range of pressures from $1\times10^{-10}$ to 4 atmospheres).

It is to be noted that $LiFePO_4$ powders can be easily doped with metal cations in order to either increase the overall voltage of cathode materials or enhance the electronic conductivity of powders. In the present invention, $LiFePO_4$ powders will be doped by mixing the appropriate amounts of either a chemical precursor of cation dopant (such as, but not limited to: metal carbonate, metal nitrates (such as, but not limited to: metal nitrate, metal carbonate, metal acetate, metal chloride, metal 2,-4 pentanedionate, metal formate, metal oxalate and metal alkoxide) or metal oxide particles (such as, but not limited to $MnO_2$, $CO_3O_4$, $NiO$, $V_2O_5$, $CaO$, $SnO_2$, and $MgO$) with precursors of iron, lithium and phosphate elements.

Figure 2:
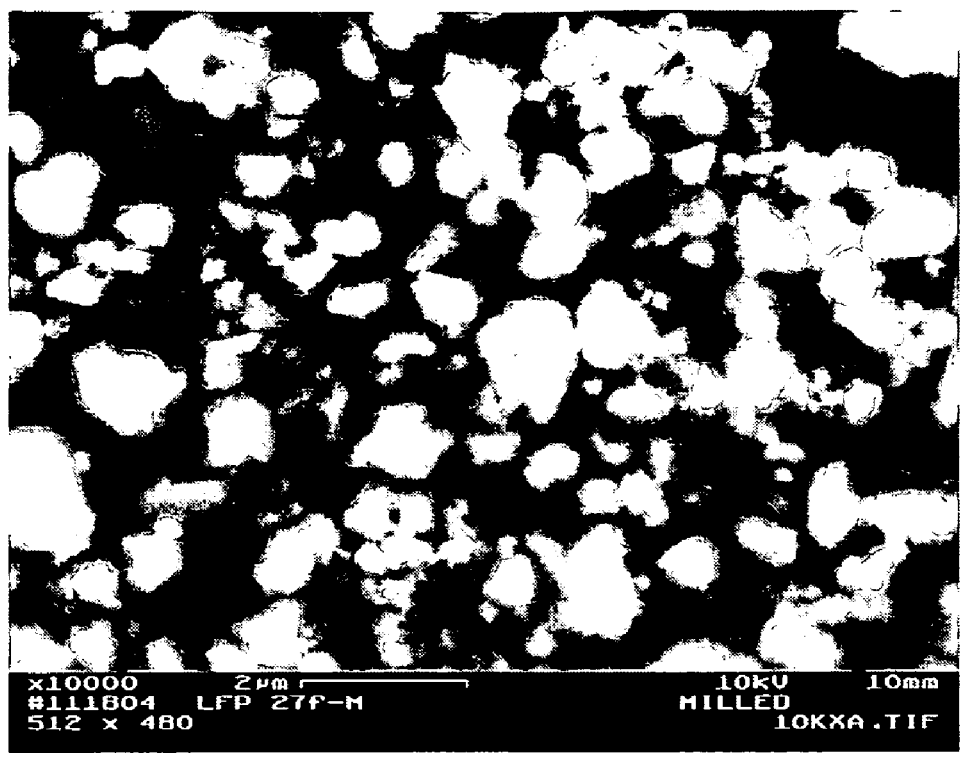
FIG. 2 is FESEM micrograph of $LiFePO_4/C$ composite powder produced in accordance with the teachings of the present invention.
Figure 3:
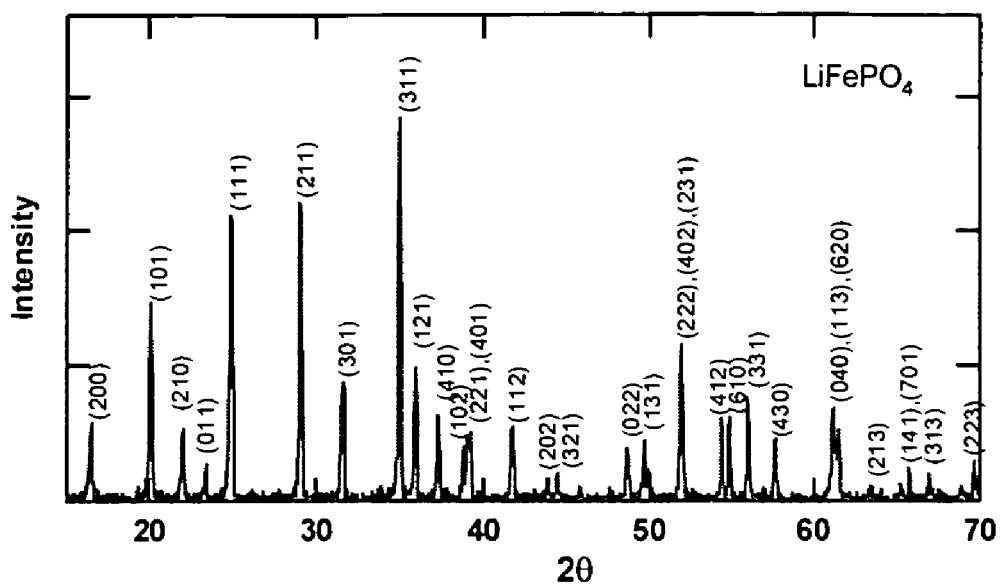
FIG. 3 is X-ray diffraction data of $LiFePO_4/C$ composite powder, produced in accordance with the teachings of the present invention, showing the pure olivine phase.

A micrograph (FIG. 2), taken by a Field Emission Scanning Electron Microscope (FESEM)), of a $LiFePO_4$ (x=1) clearly show that the average particle size is ~0.5 μm, and the powder is phase pure $LiFePO_4$ as evident from the X-ray diffraction pattern.

Electrochemical characterization of $LiFe_xM_{1-x}PO_4$ cathodes was performed in a standard coin cell configuration. Coin cells (CR032) were fabricated with $LiFePO_4$ cathodes (circular electrodes of 9 mm diameter and ~8 mg mass) containing 20 wt % fine carbon (Denka Black) and 5 wt. % polytetrafluoroethylene (PTFE) binder (Teflon 6-J, DUPONT-Mitsui Fluorochemical Co., Ltd), metallic lithium foil anodes, polyethylene separator (Tohnen Setera, Japan) and $LiPF_6$ in ethylene carbonate (EC)/diethyl carbonate (DEC) electrolyte. Typically, coin cells were subjected to charge/discharge cycling between 2 and 4.2 V versus lithium with various current densities, if not mentioned otherwise. In general, samples are tested at a current density of 0.1 mA/cm² unless specified otherwise.

Figure 4:
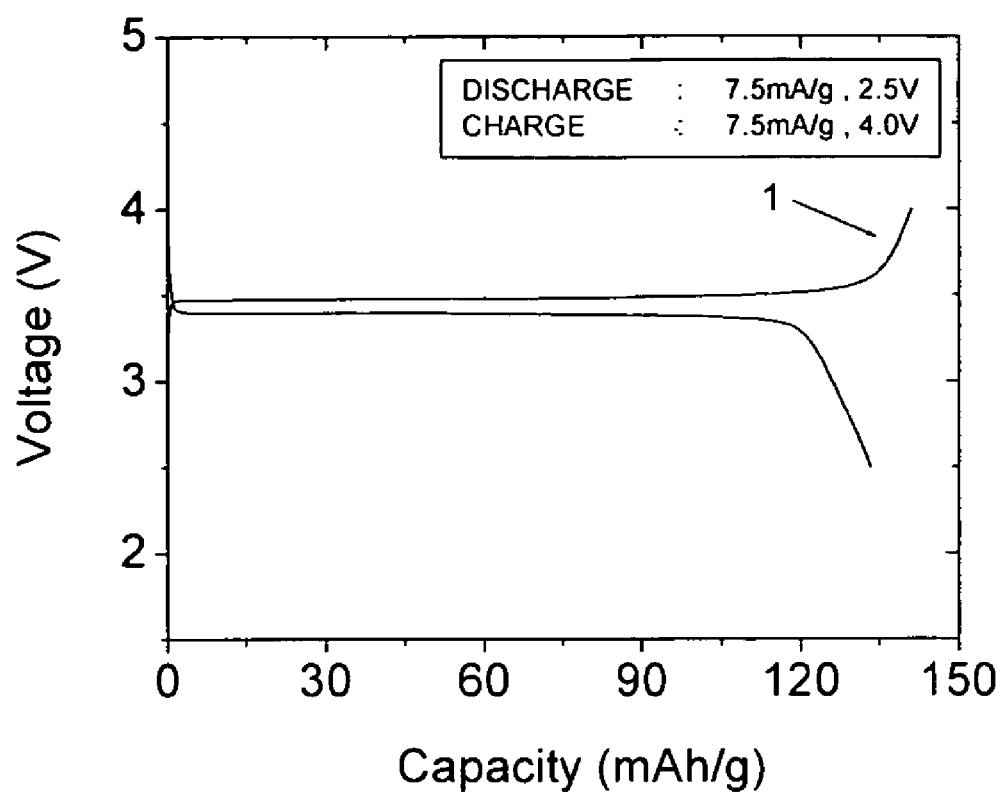
FIG. 4 are first discharge voltage curves of a $LiFePO_4/C$ composite powder produced in accordance with the teachings of the present invention.
Figure 5:
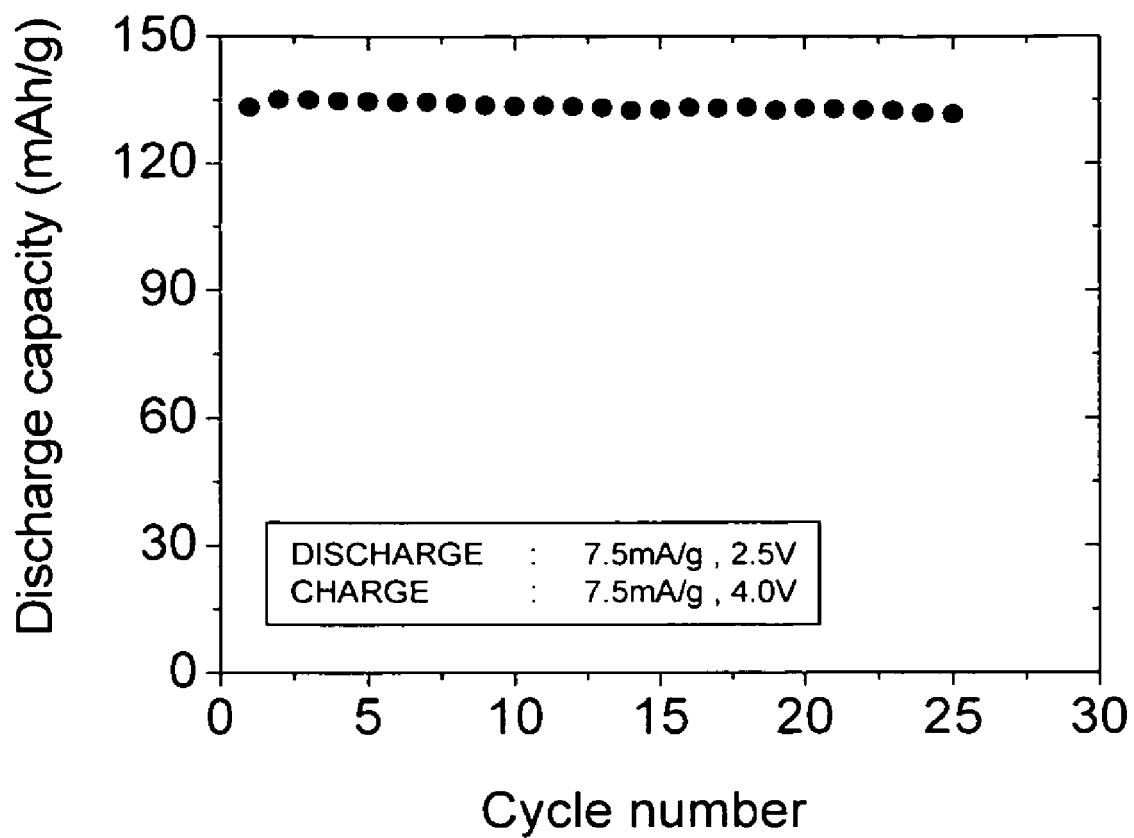
FIG. 5 shows the retention capacity versus cycle plot of a $LiFePO_4/C$ composite powder produced in accordance with the teachings of the present invention.

The discharge/charge voltage curve (4.0-2.0V), FIG. 4, of a LiFePO$_4$/C composite powder shows a flat voltage profile at ~3.4, which is characteristic of LiFePO$_4$ material. The first discharge capacity was ~135 mAh/g, and the capacity of cathode made from this powder did not show any significant fade with cycling (FIG. 5), suggesting electrochemical stability.

Example 1

Synthesis of LiFePO$_4$/C Composite Powder Using a 75/25 Mixture of Iron Oxide and Iron-Dextran Powders 14.8907 g of Fe-dextran powder, which was dried in vacuum oven for overnight, was dispersed in about 100 cc of acetone. 18.33 g of commercially available Fe$_3$O$_4$ (particle size: ~5 μm), 12.289 g of Li$_2$CO$_3$ and 36.437 g of NH$_4$H$_2$PO$_4$ were added to the Fe-dextran/acetone solution. The mixture was then transferred to a 16 oz plastic bottle, which contained 333 g of milling media (2 mm zirconia balls; in 1:4 ratio). The bottle was sealed in nitrogen by purging the gas for a couple of minutes before closing the bottle. The mixture was milled for 24 hrs in a jar mill. After the milling step, the excess acetone was evaporated using a rotary evaporator. The dried solid was heated in nitrogen at a rate of 3° C./min. to a temperature of 525° C. for 8 hrs. After crushing the powder in a mortle and pestle, the powder was recalcined at 525° C. for 8 hrs. The calcined powder was subsequently heat treated in a nitrogen atmosphere at a rate of 3° C./min. to a temperature of 685° C. for 16 hrs to obtain crystalline LiFePO$_4$/C composite powder with an olivine type structure. The surface area of this powder was in the range of 13 to 14 m$^2$/g.

Example 2

Synthesis of LiFePO$_4$/C Composite Powder Using a 50/50 Mixture of Iron Oxide and Iron-Dextran Powders 17.8689 g of Fe-dextran powder, which was dried in vacuum oven for overnight, was dispersed in about 100 cc of acetone. 7.484 g of commercially available Fe$_3$O$_4$ (particle size: ~5 μm), 7.448 g of Li$_2$CO$_3$ and 22.3084 g of NH$_4$H$_2$PO$_4$ were added to the Fe-dextran/acetone solution. The mixture was then transferred to a 8 oz plastic bottle, which contained zirconia balls. The powder to milling media ratio was kept to be 1:4. The bottle was sealed in nitrogen by purging the gas for a couple of minutes before closing the bottle. The mixture was milled for 24 hrs in a jar mill. After the milling step, the excess acetone was evaporated using a rotary evaporator. The dried solid was heated in nitrogen at a rate of 3° C./min. to a temperature of 525° C. for 8 hrs. After crushing the powder in a mortle and pestle, the powder was recalcined at 525° C. for 8 hrs. The calcined powder was subsequently heat treated in a nitrogen atmosphere at a rate of 3° C./min. to a temperature of 630° C. for 16 hrs to obtain crystalline LiFePO$_4$/C composite powder with an olivine type structure. The surface area of this powder was ~25 m$^2$/g.

Examples 3-6

Effect of Initial Mixing on LiFePO$_4$ Phase Formation

Figure 6:
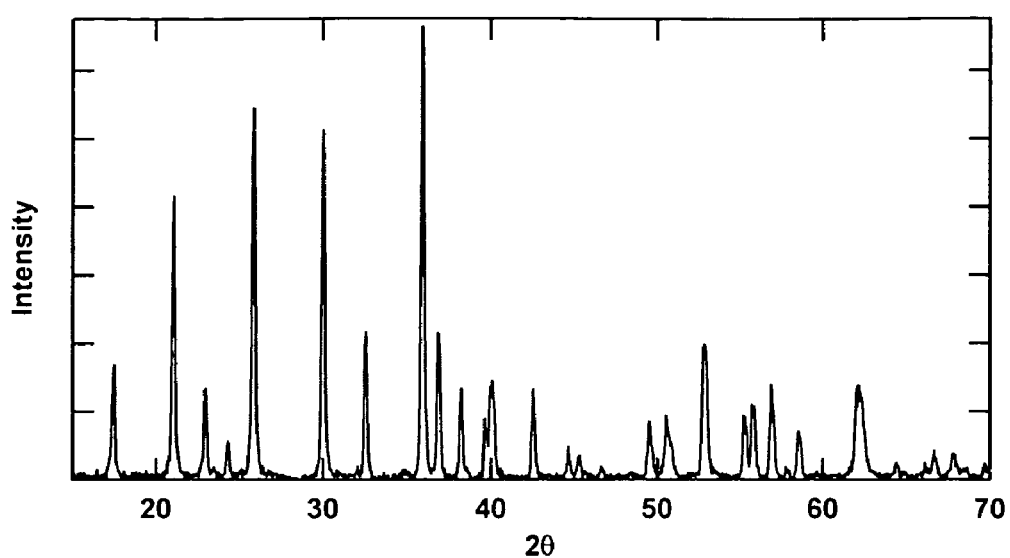
FIG. 6 is the X-ray diffraction pattern of a $LiFePO_4/C$ composite powder, which was prepared by calcining the reaction mixture at 550° C. for 8 hrs. in nitrogen.

Examples 3, 4 and 5 illustrate preferred embodiments in the preparation of fine LiFePO$_4$/C composite powder In example 3, 14.8907 g of Fe-dextran powder, which was dried in a vacuum oven overnight, was dispersed in about 250 cc of acetone. 18.33 g of commercially available Fe$_3$O$_4$ (particle size: 1-5 μm, surface area: 6-7 m$^2$/g), 12.289 g of Li$_2$CO$_3$ and 36.437 g of NH$_4$H$_2$PO$_4$ were added to Fe-dextran/acetone solution. The mixture was mixed in a high shear mixer at a speed of 7000 rpm for about 15 minutes. The mixture was then transferred to a 16 oz plastic bottle, which contained 333 g of milling media (2 mm zirconia balls; in 1:4 ratio). The bottle was sealed in nitrogen by purging the gas for a couple of minutes before closing the bottle. The mixture was milled for 24 hrs in a jar mill. After the milling step, the excess acetone was evaporated using a rotary evaporator. The dried solid was calcined in an inert atmosphere (e.g., N$_2$) at a rate of 3° C./min. to a temperature of 550° C. for 8 hrs to form the crystalline LiFePO$_4$ phase (FIG. 6). This powder was also annealed at 685° C. to determine the effect of processing temperature on the electrochemical properties of LiFePO$_4$/C composite powders.

In example 4, 14.8907 g of Fe-dextran powder, which was dried in a vacuum oven overnight, was dispersed in about 250 cc of acetone. 18.33 g of commercially available Fe$_3$O$_4$ (particle size: 1-5 μm, surface area: 6-7 m$^2$/g), 12.289 g of Li$_2$CO$_3$ and 36.437 g of NH$_4$H$_2$PO$_4$ were added to the Fe-dextran/acetone solution. The mixture was then mixed in a high shear mixer at a speed of 7000 rpm for about 15 minutes. After the mixing step, the excess acetone was evaporated using a rotary evaporator. The dried solid was calcined in an inert atmosphere (e.g., N$_2$) at a rate of 3° C./min. to a temperature of 550° C. for 8 hrs to form the crystalline LiFePO$_4$ phase.

In example 5, 14.8907 g of Fe-dextran powder, which was dried in vacuum oven for overnight, was dispersed in about 250 cc of acetone. 18.33 g of commercially available Fe$_3$O$_4$ (particle size: 1-5 μm, surface area: 6-7 m$^2$/g), 12.289 g of Li$_2$CO$_3$ and 36.437 g of NH$_4$H$_2$PO$_4$ were added to the Fe-dextran/acetone solution. The mixture was then mixed in a high shear mixer at a speed of 7000 rpm for about 15 minutes. After the mixing step, the excess acetone was decanted, and powder was dried in a vacuum oven. The dried solid was calcined in an inert atmosphere (e.g., N$_2$) at a rate of 3° C./min. to a temperature of 550° C. for 8 hrs to form the crystalline LiFePO$_4$ phase.

In example 6, 14.8907 g of Fe-dextran powder, which was dried in vacuum oven for overnight, was mixed with 18.33 g of commercially available Fe$_3$O$_4$ (particle size: 1-5 μm, surface area: 6-7 m$^2$/g), 12.289 g of Li$_2$CO$_3$ and 36.437 g of NH$_4$H$_2$PO$_4$ in a mortal and pestle and were added to the Fe-dextran/acetone solution. The mixture was then transferred to a 16 oz plastic bottle, which contained 333 g of milling media (2 mm zirconia balls; in 1:4 ratio). Bottle was sealed in nitrogen by purging the gas for a couple of minutes before closing the bottle. The mixture was milled for 24 hrs in a jar mill. The mixed powder was calcined in an inert atmosphere (e.g., N$_2$) at a rate of 3° C./min. to a temperature of 550° C. for 8 hrs. The calcined powder did not form the LiFePO$_4$ phase and contained significant amount of impurity phases. A single phase LiFePO$_4$ powder was not formed even after heat treating the powder at a high temperature, 685° C.

Effect of Initial Size of Fe$_3$O$_4$ Powder on the Electrochemical Properties of LiFePO$_4$/C Composite Powder Reducing the particle size of the iron-based compound, such as Fe$_3$O$_4$, will decrease the overall particle size of LiFePO$_4$ and may also provide better connectivity between LiFePO$_4$ and carbon particles in LiFePO$_4$/C composite powder. In order to understand the effect of the particle size of $Fe_3O_4$ powder, $LiFePO_4/C$ composite powders were produced by utilizing two $Fe_3O_4$ precursors: (i) particle size: 1-5 μm, surface area: 6-7 $m^2/g$ (example 3), and (ii) particle size: 20-40 nm, surface area: >60 $m^2/g$. Steps involved in producing $LiFePO_4/C$ composite powder using high surface area $Fe_3O_4$ particles are described below.

In example 7, 14.8907 g of Fe-dextran powder, which was dried in a vacuum oven overnight, was dispersed in about 250 cc of acetone. 18.33 g of commercially available $Fe_3O_4$ (particle size: ~20-40 nm, surface area: >60 $m^2/g$), 12.289 g of $Li_2CO_3$ and 36.437 g of $NH_4H_2PO_4$ were added to Fe-dextran/acetone solution. The mixture was mixed in a high shear mixer at a speed of 7000 rpm for about 15 minutes. The mixture was then transferred to a 16 oz plastic bottle, which contained 333 g of milling media (2 mm zirconia balls; in 1:4 ratio). The bottle was sealed in nitrogen by purging the gas for a couple of minutes before closing the bottle. The mixture was milled for 24 hrs in a jar mill. After the milling step, the excess acetone was evaporated using a rotary evaporator. The dried solid was calcined in an inert atmosphere (e.g., $N_2$) at a rate of 3° C./min. to a temperature of 550° C. for 8 hrs to form the crystalline $LiFePO_4$ phase.

The first charge and discharge capacities of a $LiFePO_4/C$ composite powder prepared according to example 3 and annealed at 550° C. for 8 hrs were 150.8 and 116.8 mAh/g, respectively. On the other hand, a $LiFePO_4/C$ composite powder prepared according to example 7 and annealed at 550° C. for 8 hrs exhibited a larger first discharge capacity, 149.6 mAh/g, when it was evaluated under similar test conditions. The first charge capacity of this composite powder was 153 mAh/g.

Based on X-ray results, it can be concluded that the method of mixing the reactant materials effects the final phase formation. Wet mixing of reactants leads to powders with a pure $LiFePO_4$ phase. Electrochemical and X-ray diffraction results suggest that the best method to produce a $LiFePO_4$ material is by mixing the starting precursor/acetone mixture in a high speed mixer and then milling the mixture in a jar mill for 24 hrs.

The present invention has been described with respect to exemplary embodiments. However, as those skilled in the art will recognize, modifications and variations in the specific details which have been described and illustrated may be resorted to without departing from the spirit and scope of the invention as defined in the appended claims.

We claim:

1. A method of producing fine lithium iron phosphate/carbon composite powders having an olivine structure of the formula, $LiFePO_4/C$, comprising the following steps:
   (1) providing a dispersion of:
      a. iron dextran nanoparticles
      b. an iron based compound
      c. a chemical precursor of phosphate ions,
      d. a lithium containing salt,
   (2) homogeneously mixing the dispersion to provide an $LiFePO_4/C$ precursor solid material,
   (3) removing and drying the $LiFePO_4/C$ precursor solid material; and
   (4) calcining the $LiFePO_4/C$ precursor solid material in an inert atmosphere at a temperature in the range of 400-700° C. for a time sufficient to remove volatile compounds, to reduce $Fe^{3+}$ to $Fe^{2+}$, and to form an olivine structured $LiFePO_4/C$ compound.

2. The method as claimed in claim 1, wherein the iron based compound is selected from the group consisting of: iron oxides, iron hydroxides, iron acetates, iron phosphates, iron sulphates, iron oxalates and iron nitrates.

3. The method as claimed in claim 1, wherein the phosphate ion containing chemical precursor is selected from the group consisting of: ammonium hydrogen phosphate, ammonium dihydrogen phosphate, ammonium phosphate, orthophosphoric acid, and lithium hydrogen phosphate.

4. The method as claimed in claim 1, wherein lithium salt is selected from the group consisting of: lithium nitrates, lithium hydroxides, lithium carbonates, lithium chlorides, lithium acetates and lithium halides.

5. The method as claimed in claim 1, wherein the dispersion comprises a liquid solution.

6. The method as claimed in claim 5, wherein the liquid solution includes acetone.

7. The method as claimed in claim 1, further including the step of annealing the calcined powder at a temperature between 400 and 700° C. in a controlled atmosphere to achieve the appropriate crystalline phase.

8. The method as claimed in claim 1, wherein the calcining step is conducted at an atmospheric pressure in the range of $1\times10^{-10}$ to 4 atmospheres.

9. The method as claimed in claim 1, wherein average primary particle size of $LiFePO_4/C$ powder is less than 1 μm.

* * * * *